(12) United States Patent
Lacy et al.

(10) Patent No.: US 11,016,764 B2
(45) Date of Patent: May 25, 2021

(54) VECTOR PROCESSING UNIT

(71) Applicant: Google LLC, Mountain View, CA (US)

(72) Inventors: William Lacy, Madison, WI (US); Gregory Michael Thorson, Waunakee, WI (US); Christopher Aaron Clark, Madison, WI (US); Norman Paul Jouppi, Palo Alto, CA (US); Thomas Norrie, Mountain View, CA (US); Andrew Everett Phelps, Middleton, WI (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/843,015

(22) Filed: Apr. 8, 2020

(65) Prior Publication Data

US 2020/0233663 A1  Jul. 23, 2020

Related U.S. Application Data

(63) Continuation of application No. 16/291,176, filed on Mar. 4, 2019, which is a continuation of application (Continued)

(51) Int. Cl.
*G06F 9/302* (2018.01)
*G06F 9/312* (2018.01)
(Continued)

(52) U.S. Cl.
CPC ............ *G06F 9/3001* (2013.01); *G06F 7/588* (2013.01); *G06F 9/30032* (2013.01);
(Continued)

(58) Field of Classification Search
CPC ............... G06F 9/3001; G06F 9/30032; G06F 9/30036; G06F 9/30043; G06F 9/30098;
(Continued)

(56) References Cited

U.S. PATENT DOCUMENTS

| 4,150,434 A | 4/1979 | Shibayama et al. |
| 4,636,942 A | 1/1987 | Chen et al. |

(Continued)

FOREIGN PATENT DOCUMENTS

| CN | 105930902 A | * | 9/2016 | ............... G06F 7/57 |
| EP | 0232827 | | 8/1987 | |

(Continued)

OTHER PUBLICATIONS

Wekipedia PowerPC (https://en.wikipedia.org/wiki/PowerPC), this page was last edited on Feb. 29, 2020 (Year: 2020).*

(Continued)

*Primary Examiner* — Daniel H Pan
(74) *Attorney, Agent, or Firm* — Fish & Richardson P.C.

(57) ABSTRACT

A vector processing unit is described, and includes processor units that each include multiple processing resources. The processor units are each configured to perform arithmetic operations associated with vectorized computations. The vector processing unit includes a vector memory in data communication with each of the processor units and their respective processing resources. The vector memory includes memory banks configured to store data used by each of the processor units to perform the arithmetic operations. The processor units and the vector memory are tightly coupled within an area of the vector processing unit such that data communications are exchanged at a high bandwidth based on the placement of respective processor units relative to one another, and based on the placement of the vector memory relative to each processor unit.

24 Claims, 4 Drawing Sheets

Related U.S. Application Data

No. 15/454,214, filed on Mar. 9, 2017, now Pat. No. 10,261,786.

(51) Int. Cl.

| | | |
|---|---|---|
| *G06F 15/80* | (2006.01) | |
| *G06F 13/40* | (2006.01) | |
| *G06F 7/57* | (2006.01) | |
| *G06N 3/063* | (2006.01) | |
| *G06N 20/00* | (2019.01) | |
| *G06F 17/16* | (2006.01) | |
| *G06F 9/30* | (2018.01) | |
| *G06F 9/38* | (2018.01) | |
| *G06F 7/58* | (2006.01) | |
| *G06F 13/36* | (2006.01) | |
| *G06F 13/42* | (2006.01) | |

(52) U.S. Cl.
CPC ...... *G06F 9/30036* (2013.01); *G06F 9/30043* (2013.01); *G06F 9/30098* (2013.01); *G06F 9/3891* (2013.01); *G06F 13/36* (2013.01); *G06F 13/4068* (2013.01); *G06F 13/4282* (2013.01); *G06F 15/8053* (2013.01); *G06F 15/8092* (2013.01); *G06F 17/16* (2013.01); *G06F 15/8046* (2013.01); *G06N 3/063* (2013.01); *G06N 20/00* (2019.01)

(58) Field of Classification Search
CPC ...... G06F 9/3891; G06F 7/588; G06F 7/5443; G06F 13/36; G06F 13/4068; G06F 13/4282; G06F 15/8053; G06F 15/8092; G06F 15/8046; G06F 17/16; G06N 3/063; G06N 20/00; G06N 20/10; G06N 20/20
USPC ............... 712/4–22, 221–225; 708/490, 501; 706/12, 26, 27
See application file for complete search history.

(56) References Cited

U.S. PATENT DOCUMENTS

| | | | | |
|---|---|---|---|---|
| 5,067,095 | A * | 11/1991 | Peterson | G06N 3/04 706/33 |
| 5,327,365 | A | 7/1994 | Fujisaki | |
| 5,805,875 | A | 9/1998 | Asanovic | |
| 5,825,677 | A | 10/1998 | Agarwal | |
| 6,539,368 | B1 | 3/2003 | Chernikov | |
| 10,261,786 | B2 | 4/2019 | Lacy et al. | |
| 2007/0150697 | A1 | 6/2007 | Sachs | |
| 2008/0091924 | A1 | 4/2008 | Jouppi | |
| 2008/0294870 | A1 | 11/2008 | Rajopadhye | |
| 2009/0150647 | A1 | 6/2009 | Mejdrich | |
| 2010/0257329 | A1* | 10/2010 | Khailany | G06F 12/0879 711/163 |
| 2011/0219207 | A1 | 9/2011 | Suh | |
| 2012/0089792 | A1 | 4/2012 | Fahs et al. | |
| 2014/0365548 | A1 | 12/2014 | Mortensen | |
| 2015/0120631 | A1* | 4/2015 | Serrano Gotarredona | G06N 3/04 706/25 |
| 2016/0163016 | A1 | 6/2016 | Gould et al. | |
| 2016/0283240 | A1 | 9/2016 | Mishra et al. | |
| 2017/0161064 | A1* | 6/2017 | Vasilyev | G06F 7/57 |
| 2018/0004530 | A1* | 1/2018 | Vorbach | G06F 9/3836 |
| 2019/0087716 | A1* | 3/2019 | Du | G06N 3/063 |

FOREIGN PATENT DOCUMENTS

| | | |
|---|---|---|
| GB | 2484906 | 5/2012 |
| WO | WO 1991/20027 | 12/1991 |

OTHER PUBLICATIONS

EP Office Action in European Application No. 17199241.5, dated Oct. 16, 2020, 7 pages.
TW Office Action in Taiwan Application No. 108110038, dated Sep. 24, 2020, 7 pages (with English translation).
'wikipedia.org' [online] "SerDes," Jun. 9, 2016 [retrieved on Feb. 5, 2018] Retrieved from Internet: URL<https://en.wikipedia.org/w/index.php?title=SerDes&oldid=724463696> 3 pages.
'www.ausairpower.net' [online] "Vector Processing Futures," Last updated on Jan. 27, 2014, [retrieved on Nov. 3, 2016] Retrieved from Internet: URL<http://www.ausairpower.net/OSR-0600.html> 10 pages.
Arora. "The Architecture and Evolution of CPU-GPU Systems for General Purpose Computing," Jan. 1, 2012, 12 pages.
Calhoun et al. "Stream Vector Processing Unit: Stream Processing Using SIMD on a General Purpose Processor," Elec525, Spring 2004, [retrieved on Feb. 16, 2017] Retrieved from Internet URL<http://www.owlnet.rice.edu/~elec525/projects/stream_report.pdf> 14 pages.
Extended European Search Report issued in European Application No. 17199241.5, dated Jun. 7, 2018, 14 pages.
GB Office Action in Great Britain Application No. GB1717851.8, dated Nov. 20, 2019, 4 pages.
International Search Report and Written Opinion issued in International Application No. PCT/US2017058561, dated Feb. 13, 2018, 21 pages.
Manadhata et al. "Vector Processors," [Retrieved on Feb. 16, 2017] Retrieved from Internet URL<http://www.cs.cmu.edu/afs/cs.cmu.edu/academic/class/15740-f03/www/lectures/vector.pdf> 4 pages.
Office Action issued in British Application No. GB1717851.8, dated Apr. 13, 2018, 8 pages.
Office Action issued in Chinese Application No. 201721706109.2, dated May 11, 2018, 4 pages.
Patterson. "Lecture 6: Vector Processing," Powerpoint, Spring 1998, Berkley, [retrieved on Feb. 16, 2017] Retrieved from Internet: URL<https://people.eecs.berkeley.edu/~pattrsn/252S98/Lec06-vector.pdf> 60 pages.
PCT International Preliminary Report on Patentability issued in PCT Application No. PCT/US2017/058561, dated Sep. 10, 2019, 13 pages.
Soliman et al. "A shared matrix unit for a chip multi-core processor," Journal of Parallel and Distributed Computing, vol. 73(8) Mar. 21, 2013, 11 pages.
TW Office Action in Taiwanese Application No. 108110038, dated Jul. 2, 2019, 4 pages (with English translation).
GB Office Action in Great Britain Application No. GB2003781.8, dated Jan. 25, 2021, 4 pages (with English translation).

\* cited by examiner

```
                                    400 ─┐
```

┌─────────────────────────────────────────────────────────────────┐
│ VECTOR MEMORY PROVIDES DATA FOR PERFORMING ONE OR MORE ARITHMETIC│
│ OPERATIONS, THE VECTOR MEMORY INCLUDING MEMORY BANKS FOR STORING │
│ RESPECTIVE DATA SETS                                             │
│                                                              402 │
└─────────────────────────────────────────────────────────────────┘
                                  │
                                  ▼
┌─────────────────────────────────────────────────────────────────┐
│ PROCESSOR UNIT RECEIVES DATA SET FROM A PARTICULAR MEMORY BANK OF THE │
│ VECTOR MEMORY                                                    │
│                                                              404 │
└─────────────────────────────────────────────────────────────────┘
                                  │
                                  ▼
┌─────────────────────────────────────────────────────────────────┐
│ EXCHANGE DATA COMMUNICATIONS AT FIRST BANDWIDTH BASED ON PROCESSOR│
│ UNIT AND VECTOR MEMORY BEING TIGHTLY COUPLED AND INCLUDING A FIRST│
│ DISTANCE BETWEEN PROCESSOR UNIT AND VECTOR MEMORY           406  │
└─────────────────────────────────────────────────────────────────┘
                                  │
                                  ▼
┌─────────────────────────────────────────────────────────────────┐
│ PROCESSOR UNIT USES AT LEAST ONE DATA SET TO PERFORM ONE OR MORE │
│ ARITHMETIC OPERATIONS ASSOCIATED WITH VECTORIZED COMPUTATIONS    │
│                                                              408 │
└─────────────────────────────────────────────────────────────────┘
                                  │
                                  ▼
┌─────────────────────────────────────────────────────────────────┐
│ EXCHANGE DATA COMMUNICATIONS AT SECOND BANDWIDTH BASED ON        │
│ PROCESSOR UNIT AND MATRIX OPERATION UNIT BEING COUPLED AND INCLUDING A│
│ SECOND DISTANCE BETWEEN PROCESSOR UNIT AND VECTOR MEMORY    410  │
└─────────────────────────────────────────────────────────────────┘

┌─────────────────────────────────────────────────────────────────┐
│ MATRIX OPERATION UNIT RECEIVES AT LEAST TWO OPERANDS FROM THE    │
│ PROCESSOR UNIT, THE AT LEAST TWO OPERANDS BEING USED BY THE MATRIX│
│ OPERATION UNIT TO PERFORM OPERATIONS ASSOCIATED WITH VECTORIZED  │
│ COMPUTATIONS                                                     │
│                                                              412 │
└─────────────────────────────────────────────────────────────────┘

FIG. 4

VECTOR PROCESSING UNIT

CROSS-REFERENCE TO RELATED APPLICATION

This application is a continuation of U.S. application Ser. No. 16/291,176, filed Mar. 4, 2019, which is a continuation of U.S. application Ser. No. 15/454,214, filed Mar. 9, 2017, the contents of each are incorporated by reference herein.

BACKGROUND

This specification relates to localized vector processing units that can be used to perform a variety of computations associated with dimensional arrays of data which can generally be referred to as vectors.

Vector processing units can be used for computations associated with technology fields such as numerical simulations, graphics processing, gaming console design, supercomputing, and machine learning computations for Deep Neural Networks ("DNN") layers.

In general, neural networks are machine learning models that employ one or more layers of models to generate an output, e.g., a classification, for a received input. A neural network having multiple layers can be used to compute inferences by processing the input through each of the layers of the neural network.

SUMMARY

As compared to features of conventional vector processing units (VPUs), this specification describes a VPU configured to partition computations into: a) an example single instruction multiple data (SIMD) VPU having increased flexibility, increased memory bandwidth requirements, and fairly low computational density; b) a matrix unit (MXU) with lower flexibility, low memory bandwidth requirements, and high computational density; and c) a low memory-bandwidth cross-lane unit (XU) for performing certain operations that might not fit into the SIMD paradigm, but also might not have the computational density of MXU computational operations. In general, at least the contrast between the computational features of a) and b), provide for an enhanced SIMD processor design architecture relative to current/conventional SIMD processors. In some implementations, the described VPU is an example Von-Neumann SIMD VPU.

In general, one innovative aspect of the subject matter described in this specification can be embodied in a vector processing unit, including, one or more processor units that are each configured to perform arithmetic operations associated with vectorized computations for a multi-dimensional data array; and a vector memory in data communication with each of the one or more processor units. The vector memory includes memory banks configured to store data used by each of the one or more processor units to perform the arithmetic operations. The one or more processor units and the vector memory are tightly coupled within an area of the vector processing unit such that data communications can be exchanged at a high bandwidth based on the placement of respective processor units relative to one another and based on the placement of the vector memory relative to each processor unit.

In some implementations, the vector processing unit couples to a matrix operation unit configured to receive at least two operands from a particular processor unit, the at least two operands being used by the matrix operation unit to perform operations associated with vectorized computations for the multi-dimensional data array. In some implementations, the vector processing unit further includes a first data serializer coupled to the particular processor unit, the first data serializer being configured to serialize output data corresponding to one or more operands provided by the particular processor unit and received by the matrix operation unit. In some implementations, the vector processing unit further includes a second data serializer coupled to the particular processor unit, the second data serializer being configured to serialize an output data provided by the particular processor unit and received by at least one of: the matrix operation unit, a cross-lane unit, or a reduction and permute unit.

In some implementations, each of the one or more processor units include a plurality of processing resources and the plurality of processing resources include at least one of a first arithmetic logic unit, a second arithmetic logic unit, a multi-dimensional register, or a function processor unit. In some implementations, the vector memory is configured to load data associated with a particular memory bank to respective processor units, and wherein the data is used by a particular resource of the respective processor units. In some implementations, the vector processing unit further includes a crossbar connector intermediate the one or more processor units and the vector memory, the crossbar connector being configured to provide data associated with a vector memory bank to a particular resource of the plurality of processing resources of a particular processor unit.

In some implementations, the vector processing unit further includes a random number generator in data communication with a resource of a particular processor unit, the random number generator being configured to periodically generate a number that can be used as an operand for at least one operation performed by the particular processor unit. In some implementations, the vector processing unit provides a primary processing lane and includes multiple processor units that each respectively form a processor sub-lane within the vector processing unit. In some implementations, each processor sub-lane is dynamically configured on a per-access basis to access a particular memory bank of the vector memory to retrieve data used to perform one or more arithmetic operations associated with vectorized computations for the multi-dimensional data array.

Another innovative aspect of the subject matter described in this specification can be embodied in a computing system having a vector processing unit, the computing system including, processor units that each include a first arithmetic logic unit configured to perform a plurality of arithmetic operations; a vector memory in data communication with each of the one or more processor units, the vector memory including memory banks configured to store data used by each of the one or more processor units to perform the arithmetic operations; and a matrix operation unit configured to receive at least two operands from a particular processor unit, the at least two operands being used by the matrix operation unit to perform operations associated with vectorized computations.

The one or more processor units and the vector memory are tightly coupled within an area of the vector processing unit such that data communications can be exchanged at a first bandwidth based on a first distance between at least one processor unit and the vector memory. The vector processing unit and the matrix operation unit are coupled such that data communications can be exchanged at a second bandwidth based on a second distance between at least one processor unit and the matrix operation unit. The first distance is less than the second distance and the first bandwidth is greater than the second bandwidth.

In some implementations, the computing system further includes a first data serializer coupled to the particular processor unit, the first data serializer being configured to serialize output data corresponding to one or more operands provided by the particular processor unit and received by the matrix operation unit. In some implementations, the computing system further includes a second data serializer coupled to the particular processor unit, the second data serializer being configured to serialize output data provided by the particular processor unit and received by at least one of: the matrix operation unit, a cross-lane unit, or a reduction and permute unit. In some implementations, each of the one or more processor units further include a plurality of processing resources comprising at least one of a second arithmetic logic unit, a multi-dimensional register, or a function processor unit.

In some implementations, the vector memory is configured to load data associated with a particular memory bank to respective processor units, and wherein the data is used by a particular resource of the respective processor units. In some implementations, the computing system further includes a crossbar connector intermediate the one or more processor units and the vector memory, the crossbar connector being configured to provide data associated with a vector memory bank to a particular resource of the plurality of processing resources of a particular processor unit. In some implementations, the computing system further includes a random number generator in data communication with a resource of a particular processor unit, the random number generator being configured to periodically generate a number that can be used as an operand for at least one operation performed by the particular processor unit. In some implementations, the computing system further includes a data path that extends between the vector memory and the matrix operation unit, the data path enabling data communications associated with direct memory access operations that occur between the vector memory and at least the matrix operation unit.

Another innovative aspect of the subject matter described in this specification can be embodied in a computer-implemented method in a computing system having a vector processing unit. The method includes, providing, by a vector memory, data for performing one or more arithmetic operations, the vector memory including memory banks for storing respective sets of data, receiving, by one or more processor units, data from a particular memory bank of the vector memory, the data being used by the one or more processor units to perform one or more arithmetic operations associated with vectorized computations; and receiving, by a matrix operation unit, at least two operands from a particular processor unit, the at least two operands being used by the matrix operation unit to perform operations associated with vectorized computations. The one or more processor units and the vector memory are tightly coupled within an area of the vector processing unit such that data communications occur at a first bandwidth based on a first distance between at least one processor unit and the vector memory. The vector processing unit and the matrix operation unit are coupled such that data communications occur at a second bandwidth based on a second distance between at least one processor unit and the matrix operation unit. The first distance is less than the second distance and the first bandwidth is greater than the second bandwidth.

The subject matter described in this specification can be implemented in particular embodiments so as to realize one or more of the following advantages. Using a vector processing unit that includes highly localized data storage and computational resources can provide increased data throughput relative to current vector processors. The described vector memory and processing unit architecture enables localized high bandwidth data processing and arithmetic operations associated with vector elements of an example matrix-vector processor. Hence, computational efficiency associated with vector arithmetic operations can be enhanced and accelerated based on use of vector processing resources that are disposed within a circuit die in a tightly coupled arrangement.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 is an example flow chart of a process for performing vector computations.

Like reference numbers and designations in the various drawings indicate like elements.

DETAILED DESCRIPTION

Figure 1:
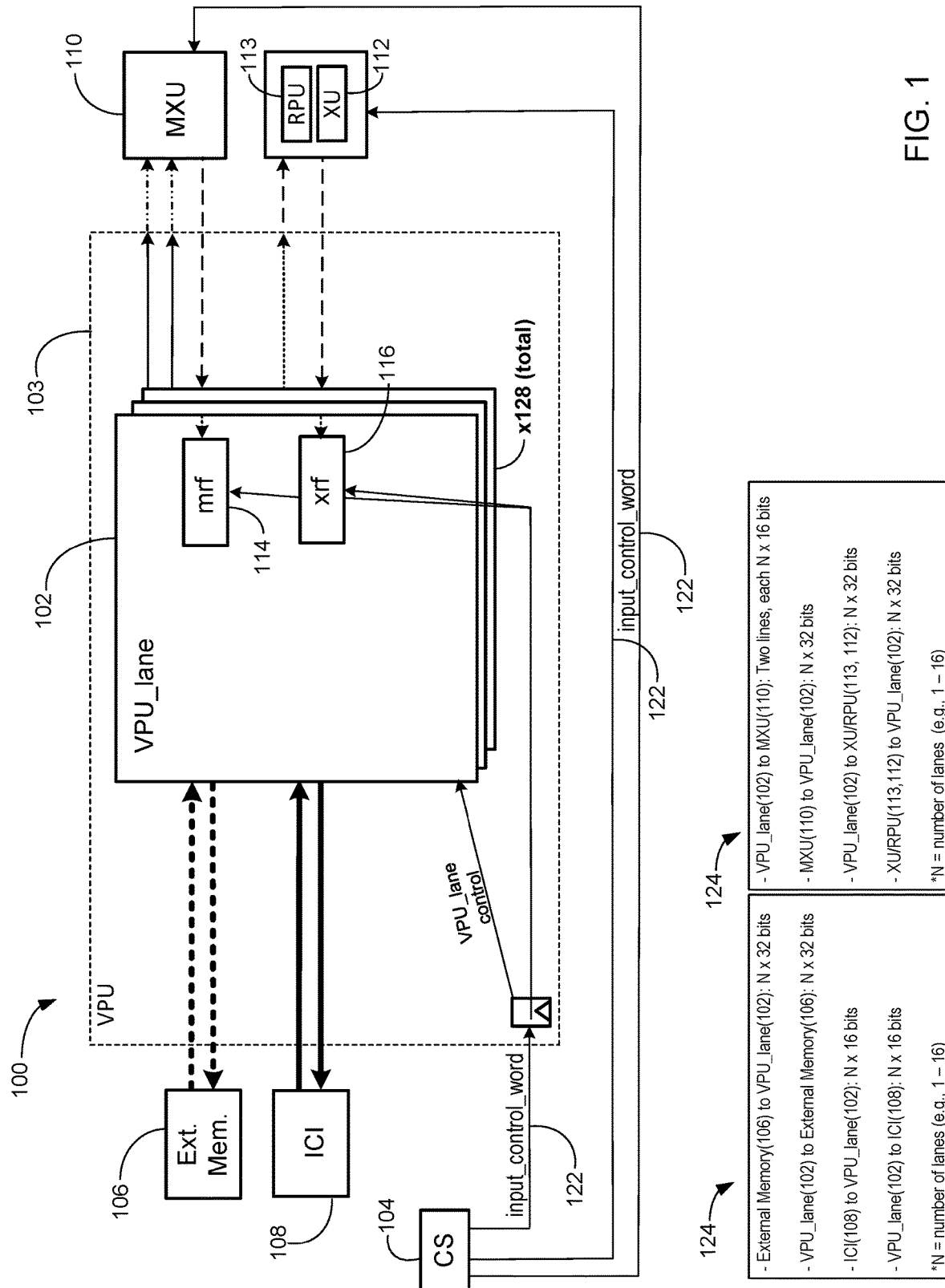
FIG. 1 illustrates a block diagram of an example computing system including one or more vector processing units and multiple computing resources.

The subject matter described in this specification generally relates to a vector processing unit (VPU) that includes highly localized data processing and computational resources that are configured to provide increased data throughput relative to current vector processors. The described VPU includes an architecture that supports localized high bandwidth data processing and arithmetic operations associated with vector elements of an example matrix-vector processor.

In particular, the specification describes a computing system that includes computational resources of a VPU that can be disposed in a tightly coupled arrangement within a predefined area of an integrated circuit die. The predefined area can be segmented in multiple VPU lanes and each lane can include multiple localized and distinct computational resources. Within in each VPU lane, the resources include a vector memory structure that can include multiple memory banks each having multiple memory address locations. The resources can further include multiple processing units or VPU sublanes that each include multiple distinct computing assets/resources.

Each VPU sublane can include a multi-dimensional data/file register configured to store multiple vector elements, and at least one arithmetic logic unit (ALU) configured to perform arithmetic operations on the vector elements accessible from, and stored within, the data register. The computing system can further include at least one matrix processing unit that receives serialized data from respective VPU sublanes. In general, the matrix processing unit can be used to perform non-local, low-bandwidth, and high-latency, computations associated with, for example, neural network inference workloads.

For the described computing system, the highly localized nature of the vector processing functions provides for high-bandwidth and low-latency data exchanges between the vector memory and multiple VPU sublanes, between the respective VPU sublanes, as well as between the data registers and the ALU. The substantially adjacent proximities of these resources enable data processing operations to occur within a VPU lane with sufficient flexibility and at desired performance and data throughput rates that exceed existing vector processors.

By way of example, the computing system described in this specification can perform the computations of a neural network layer by distributing vectorized computations across multiple matrix-vector processors. A computation process performed within a neural network layer may include a multiplication of an input tensor including input activations with a parameter tensor including weights. A tensor is a multi-dimensional geometric object and example multi-dimensional geometric objects include matrices and data arrays.

In general, computations associated with neural networks may be referenced in this specification to illustrate one or more functions of the described VPU. However, the described VPU should not be limited to machine learning or neural network computations. Rather, the described VPU can be used for computations associated with a variety of technology fields that implement vector processors to achieve desired technical objectives.

Further, in some implementations, large sets of computations can be processed separately such that a first subset of computations can be divided for processing within separate VPU lanes, while a second subset of computations can be processed within an example matrix processing unit. Hence, this specification describes data flow architectures which enable both kinds of data connectivity (e.g., local VPU lane connectivity & non-local matrix unit connectivity) to realize advantages associated with both forms of data processing.

FIG. 1 illustrates a block diagram of an example computing system 100 including one or more vector processing units and multiple computing resources. Computing system 100 (system 100) is an example data processing system for performing tensor or vectorized computations associated with inference workloads for multi-layer DNNs. System 100 generally includes vector processing unit (VPU) lane 102, core sequencer 104, external memory (Ext. Mem.) 106, and inter-chip interconnect (ICI) 108.

As used herein, a lane generally corresponds to an area, section or portion of an example integrated circuit die that can include a computing/data processing resource(s) of a VPU. Likewise, as used herein, a sublane generally corresponds to a sub-area, sub-section or sub-portion of a lane of an example integrated circuit die that can include a computing/data processing resource(s) of a VPU.

System 100 can include multiple VPU lanes 102 disposed on an integrated circuit (IC) die 103. In some implementations, IC die 103 can correspond to a portion or section of a larger IC die that includes, in adjacent die sections, other circuit components/computing resources depicted in FIG. 1. While in other implementations, IC die 103 can correspond to a single IC die that generally does not include, within the single die, the other circuit components/computing resources depicted in FIG. 1.

As shown, the other components/computing resources can include the reference features (i.e., external memory 106, ICI 108, MXU 110, XU 112, RPU 113) which are outside of the area enclosed by dashed line of IC die 103. In some implementations, multiple VPU lanes 102 form the described VPU, and the VPU can be augmented by functionality provided by at least one of MXU 110, XU 112, or RPU 113. For example, 128 VPU lanes 102 can form an example described VPU. In some instances, fewer than 128 VPU lanes 102, or more than 128 VPU lanes 102, can form an example described VPU.

As discussed in more detail below, each VPU lane 102 can include vector memory (vmem 204 in FIG. 2) having multiple memory banks with address locations for storing data associated with elements of a vector. The vector memory provides on-chip vector memory accessible by respective processing units of the multiple VPU lanes 102 that can be disposed within IC die 103. In general, external memory 106 and ICI 108 each exchange data communications with individual vmems 204 (described below) that are each associated with respective VPU lanes 102. The data communications can generally include, for example, writing of vector element data to a vmem of a particular VPU lane 102 or reading data from a vmem of a particular VPU lane 102.

As shown, in some implementations, IC die 103 can be a single VPU lane configuration providing vector processing capability within system 100. In some implementations, system 100 can further include a multiple VPU lane configuration that has 128 total VPU lanes 102 that provide even more vector processing capability within system 100, relative to the single VPU lane configuration. The 128 VPU lane configuration is discussed in more detail below with reference to FIG. 2.

External memory 106 is an example memory structure used by system 100 to provide and/or exchange high bandwidth data with the vector memory associated with respective processing units of VPU lane 102. In general, external memory 106 can be a distant or non-local memory resource configured to perform a variety of direct memory access (DMA) operations to access, read from, write to, or otherwise store and retrieve data associated with address locations of the vector memory banks within system 100. External memory 106 can be described as off-chip memory configured to exchange data communications with on-chip vector memory banks (e.g., vmem 204) of system 100. For example, with reference to FIG. 1, external memory 106 can be disposed at a location outside of IC die 103 and thus can be distant or non-local relative to computing resources which are disposed within IC die 103.

In some implementations, system 100 can include an embedded processing device (discussed below) that executes software based programmed instructions (e.g., accessible from an instruction memory) to, for example, move blocks of data from external memory 106 to vmem 204. Further, execution of the programmed instructions by the embedded processor can cause external memory 106 to initiate data transfers to load and store data elements within a vector memory accessible by respective processing units of VPU lane 102. The stored data elements can correspond to register data accessible by a particular processing unit to instantiate a vector element in preparation for execution of one or more vector arithmetic operations.

In some implementations, vmem 204, external memory 106 and other related memory device of system 100 can each include one or more non-transitory machine-readable storage mediums. The non-transitory machine-readable storage medium can include solid-state memory, magnetic disk (internal hard disks or removable disks), optical disk, a random access memory (RAM), a read-only memory (ROM), an erasable programmable read-only memory (e.g., EPROM, EEPROM, or Flash memory), or any other tangible medium capable of storing information. System 100 can further include one or more processors and memory that can be supplemented by, or incorporated in, special purpose logic circuitry.

ICI 108 provides an example resource that can manage and/or monitor the multiple interconnected data communication paths that couple disparate computing/data processing resources within system 100. In some implementations, ICI 108 can generally include a data communication path that enables data flow between non-local/off-chip devices and on-chip/local computing resources. Further, ICI 108 can also generally include a communication path that enables data flow between various on-chip or local computing resources disposed within IC die 103.

The multiple communication paths within system 100 that couple the various resources can each be configured to have different or overlapping bandwidth or throughput data rates. As used herein, in the context of computing systems, the term bandwidth and the term throughput generally correspond to the rate of data transfer, such as bit rate or data quantity. In some implementations, the bit rate can be measured in, for example, bits/bytes per second, bits/bytes per clock cycle, while data quantities can correspond to the general width in bits/words of data that moves through the multiple lanes of system 100 (e.g., 2 lanes×16-bit).

System 100 can further include a matrix unit (MXU) 110, a cross-lane unit (XU) 112, a reduction and permute unit (RPU) 113, a matrix return element (mrf) 114, a cross-lane return element (xrf) 116, and an input control 122. In general, input control 122 can be a conventional control line used by a non-local control device (e.g., core sequencer 104) to provide one or more control signals to cause at least one of MXU 110, XU 112, RPU 113, mrf 114, xrf 116, or PRNG 118 to perform a desired function. In some implementations, core sequencer 104 provides multiple control signals, via input control 122, to components of VPU lane 102 so as to control the functions of an entire VPU lane 102.

Although depicted in the example of FIG. 1, mrf 114, xrf 116, and PRNG 118 and their corresponding functionality are discussed in greater detail below with reference to the implementation of FIG. 2. Similarly, MXU 110, XU 112, and RPU 113 are discussed in greater detail below with reference to the implementation of FIG. 2 and FIG. 3.

FIG. 1 includes data listings 124 (also shown in FIG. 2 as feature 224) that indicate the relative size, e.g., in bits, for data throughput associated with a particular data path for "N" number of lanes, where N can vary/range from, e.g., 1 to 16 lanes. As shown in FIG. 1 and FIG. 2, data lines can be depicted using different dashed line features to indicate that particular lanes/data paths can have differing individual throughput (in bits/bytes) attributes. Note that data listings 124 and 224 are not included in system 100 but rather are shown in FIGS. 1 and 2 for clarity and to indicate the throughput for particular data paths that couple disparate computing resources.

Figure 2:
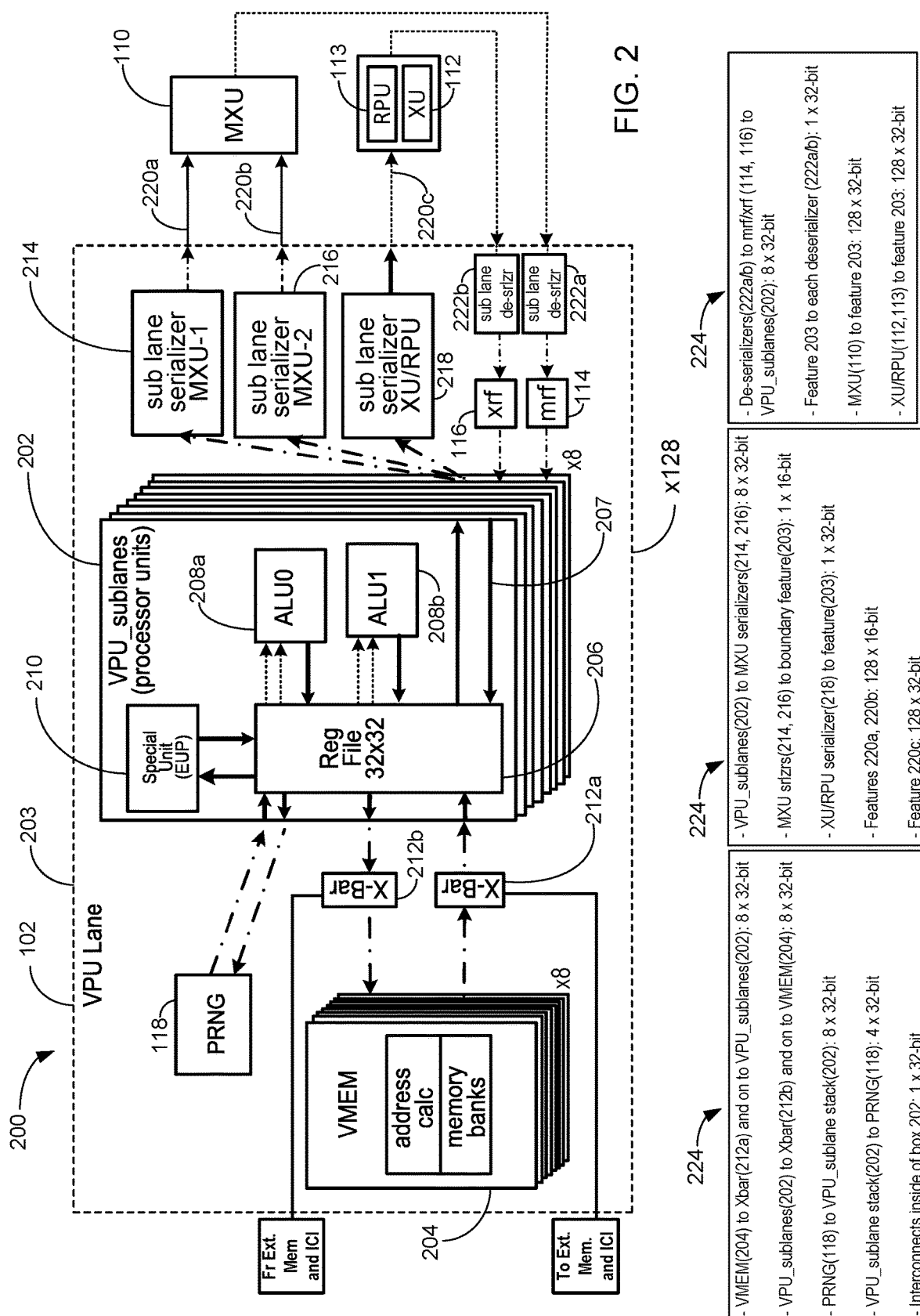
FIG. 2 illustrates a block diagram of a hardware structure of an example vector processing unit.

FIG. 2 illustrates a block diagram of a hardware structure of an example vector processing unit of the system of FIG. 1. Computing system 200 (system 200) generally includes multiple processing units 202, a vector memory (vmem) 204, a register file 206, a processing unit interconnect 207, a first arithmetic logic unit (ALU) 208a, a second ALU 208b, a special unit 210, a first crossbar 212a, and a second crossbar 212b. In the implementation of FIG. 2, processing unit 202 is depicted as a sublane of VPU lane 202. In some implementations, multiple (×8) processing units 202 can be disposed within a single VPU lane 202.

In some implementations, one or more circuit portions of system 100 can be disposed within a predefined area of IC die 103. As discussed above, system 100 can include multiple VPU lanes 102 disposed on IC die 103. In some implementations, IC die 103 can be segmented into portions or sections that include die sub-sections having certain computing resources disposed within the sub-section. Hence, in the example of FIG. 2, a single VPU lane 102 can include multiple VPU sublanes (i.e., processing units) 202 disposed on an IC die section 203 that corresponds to a sub-portion/sub-section of larger IC die 103.

In general, processor units 202 of VPU lane 102 can each include multiple processing resources and each processor unit 202 can be configured to perform arithmetic operations (via ALUs) associated with vectorized computations for a multi-dimensional data array. As shown, each processing unit or sublane 102 includes register file 206, ALU 208a and ALU 208b, and special unit 210. Computing resources disposed within IC die section 203 can be tightly coupled together and, thus, disposed substantially adjacent one another within IC die section 203. The substantially adjacent proximities of these processing resources enable data operations to occur in VPU lane 102 with sufficient flexibility and at high bandwidth or data throughput rates.

In some implementations, "tightly coupled" can correspond to wiring between components/computing resources and data transfer bandwidths that are both consistent with connecting components/resources within, for example, 100 microns of each other. In other implementations, "coupled," rather than "tightly coupled," can correspond to wiring between components/resources and data transfer bandwidths that are each consistent with connecting components within, for example, 200 microns-10 mm of each other.

In alternative implementations, components or computing resources of system 100, 200 can be tightly coupled, or coupled, with reference to a particular ratio of total die dimensions (e.g., dimension of die 103 or dimension of die section 203). For example, "tightly coupled" can correspond to components that are connected within up to 5% of total die edge dimensions, while "coupled" can correspond to components that are further away, such as up to 50% of total die edge dimensions.

In some implementations, innovative features of the described VPU of computing system 100 includes components and/or computing resources in VPU lane 102 each being within a particular, or threshold, distance of each other such that data (e.g., one or more 32-bit words) can easily traverse the distance in a single clock cycle (i.e., wire delay). In some implementations, these innovative features of the described VPU correspond directly to at least the tightly coupled placement of components of VPU lane 102 relative to each other.

In some implementations, conductors (i.e., wires) that provide data flow paths between disparate, tightly coupled, resources of sublane 102 can be quite short in length yet large in conductor count or bus width where a bus can be a set of wires. The larger bus width (when compared to conventional IC bus widths) enables high bandwidth transmission of data, corresponding to large numbers of operations. The high bandwidth attribute of the multiple operations enable data to traverse the localized resources of processing unit 102 with low latency. As used herein, high bandwidth and low latency corresponds to hundreds (or thousands in some implementations) of operations associated with multiple 16-bit to 32-bit words (i.e., high bandwidth) moving from one computing resource to another in a single clock cycle (i.e., low latency). The high bandwidth, low latency attributes of system 200 are described in more detail herein below.

In general, individual vmems 204 that are associated with respective VPU lanes 102 are each configured to exchange data communications with external memory 106. The data communications can generally include, for example, external memory 106 writing/reading vector element data to/from vmems 204 of respective VPU lanes 102. Vmem 204 is in data communication with each of processor unit 202 and their respective multiple processing resources (e.g., ALU 208a/208b). Vmem 204 can include multiple memory banks that store, at respective address locations, data used by each of processor units 202 to instantiate vectors (via register 206) that are accessed by ALU 208a/208b to perform one or more arithmetic operations.

In some implementations, VPU lane 102 can include a data path that extends between vmem 204 and a loosely coupled memory disposed at one or more locations in system 200. The loosely coupled memory can include off-chip memories, on-chip memories that do not require tight coupling or high bandwidth, memories from other processing units such as other VPUs on the interconnect, or data transferred to or from an attached host computer. In some implementations, DMA transfers can be initiated by control signals locally (e.g., from CS unit 104) or remotely (e.g., by the host computer). In some implementations, data communications traverse the data path by way of ICI network 108, while in other implementations the data communications can traverse the data path through a processor unit 202. In some implementations, the DMA pathways can also be serialized/de-serialized in the same mechanism as used by data paths that extend to and from MXU 110.

System 200 generally provides a two-dimensional (2-D) array of data paths that are tightly coupled such that system 100 can execute thousands of data transfer operations per clock cycle. The two dimensions correspond to a total of 128 lanes (e.g., 128 VPU lanes 102) by 8 sublanes per lane. VPU lane 102 can be described as a unit of processing that includes multiple (e.g., x8) processor units (i.e., sublanes) that are each generally coupled to one of multiple (e.g., x8) memory banks. The 2-D array of data paths of system 200 can have a spatial characteristic whereby particular data paths can be coupled and implemented across separate hardware structures.

In some implementations, for the 8 distinct processing units 202 (i.e., the x8 dimension) of a VPU lane 102, data operations for that single lane 102 can be serialized and de-serialized, by de-serializer 222a/b, when the 8 processing units 202 exchange data communications with other resources of system 200, such as MXU 110, XU 112, and RPU 113 (discussed below). For example, a particular vector processing operation can include VPU lane 102 sending multiple (x8) 32-bit words to MXU 110. Thus, each of the 8 processing units 202 in a single lane 102 can transmit, to MXU 110, a 32-bit word accessible from its local register 206.

In some implementations, the 32-bit words can be sent in a serialized manner as 16-bit rounded floating-point numbers, at an example data rate of one word per clock cycle (16 bits/clk). The vector processing operation can further include the MXU 110 providing results, to each of the 8 processing units 202, of multiply operations performed by the MXU. The results can be received by a VPU lane 102 and simultaneously stored (i.e., de-serialized) within respective registers 206 of the 8 sublanes 202 in a single processor clock cycle (256 bits/clk).

Crossbar 212a provides a data path from vmem 204 to at least one processor unit 202 and includes 32-bit words that traverse the data path during certain data transfer operations. Likewise, crossbar 212b provides a data path from at least one processor unit 202 to vmem 204 and includes 32-bit words that traverse the data path during certain data transfer operations. In some implementations, the interface between vmem 204 and a particular VPU sublane 202 is a load-type instruction. For example, a particular operational instruction (e.g., from instruction memory) can specify, for each sublane 202, the particular memory bank a sublane will access to pull vector related data for loading to local register 206. In some implementations, each processor unit 202 can be dynamically configured on a per-access basis to access a particular memory bank of vmem 204 to retrieve vector data.

In some implementations, data transfer via crossbar 212a/b occurs in the x8 dimension of the above-mentioned 2-D array of data paths within system 200. Crossbar 212a/b enables full connectivity between each of the individual sublanes 202 (x8) and each of the individual memory banks of vmem 204 (x8) within each lane of the 128 lanes. In general, because vmem 204 is disposed within IC die section 203 at a substantially close proximity to the respective processor units 202, crossbar 212a/b can be implemented via conductor wires that are quite short in length, yet fairly large in bus width (or wire count) to facilitate high data throughput between a processor unit 202 and vmem 204. In some implementations, vmem 204 can execute a broadcast function to provide a particular set of vector data to multiple processing units 202.

As indicated above, each processing unit 202 can include a multi-dimensional data/file register 206 configured to store multiple vector elements. Hence, register 206 can be fixed length memory unit that stores data corresponding to a single vector. In particular, data received by a processor unit 202 (from vmem 204) can be used by register 206 to populate a particular vector register having multiple vector elements. In some implementations, register 206 uses data received from a particular memory bank of vmem 204 to populate up to 32 vector registers which can be generally denoted as $V_0$-$V_{31}$. More particularly, each vector register can include multiple 32-bit words. As used herein, a vector can generally correspond to an array (linear or non-linear) of binary values that correspond to certain types of data such as integer or floating point numbers.

The 32-bit data can correspond to one or more ALU operands. In some implementations, each processing unit 202 accesses a particular memory bank of vmem 204 to load its own local register file 206 to perform its own local processing. In an example process, one or more processing units 202 of system 200 can be configured to execute instructions (e.g., a code sequence) for an example arithmetic operation. Sublane interconnect 207 can be used to move data between at least two distinct processing units of system 200.

The arithmetic operation can include two register load operations, an add operation, and a store operation. In some implementations, the instructions for the operation can be fetched from an instruction memory (not shown) and decoded locally in response to system 200 receiving certain control signals from an example higher level controller device. Regarding the operation, a first load sequence can include system 200 loading vector data from an example memory address 0x00F100 of vmem 204 to at least one vector register ($V_0$) of processing unit 202. Similarly, a second load sequence can include system 200 loading vector data from an example memory address 0x00F200 of vmem 204 to at least one other vector register ($V_1$) of processing unit 202.

In terms of hardware layout, in some implementations, vmem 204 can be divided into 128 lanes by 8 memory banks per lane, each bank having multiple address locations. Thus, during a load sequence of the operation, an example register within system 100, 200 will receive vector data from vmem 204. In some implementations, and as indicated above, an example vector processing unit can include multiple VPU lanes 102. Hence, respective registers 206 across one or more VPU lanes 102 can cooperate to form a vector register that spans a dimension of 128 lanes by the 8 sublanes 202.

In the 128 dimension, a single VPU lane 102 can load from its respective vmem 204. More particularly, in the sublane dimension (×8), each sublane 202 can load its vector register from a particular memory bank of the 8 banks of vmem 204. In some implementations, strided memory access operations can be executed as well. Regarding the operation, completion of the first load sequence causes vector data to be loaded into vector register $V_0$ such that the register will include 128×8 values. For clarity, in some implementations, the full dimension of the vector registers of VPU lane 102 can be 128 lanes×8 sublanes×32 registers× 32 bits. Hence, 128×8 corresponds to the total number of sublanes while 32×32 corresponds to the number of vector register bits per each sublane.

Completion of the second load sequence causes vector data to be loaded into vector register $V_1$ such that the register will also include 128×8 values. Next, an add instruction, via one of ALU 208a or 208b, can be executed that includes adding $V_0$ (128×8 values) to $V_1$ (128×8 values). In some implementations, an example permute operation (to order, rearrange or sequence the data) can be executed on the summed vector data after execution of a store operation to store the data in an example vector register $V_3$. Further, as discussed below, a permute operation can be executed to move data between at least two distinct VPU lanes 102.

The high bandwidth, low latency attributes of the localized resources within IC die section 203 can be characterized with reference to the following example. In general, the 128×8 dimensionality of system 200 creates 1024 potential data paths within an example VPU. These data paths correspond to, in a single lane (VPU lane 102), the 8 memory banks of vmem 204 that provide 8 individual 32-bit words along 8 individual lanes (via crossbar 212a/b) to each of the 8 individual sublanes within VPU lane 202. More particularly, these 8 individual lanes are replicated across 128 lanes so as to create the 1024 potential data paths.

The 1024 data paths can correspond to 1024 operations when respective 32-bit words traverse a path between a first resource in IC die section 203 and a second resource in IC die section 203. Further, the inclusion of ALUs 208a, 208b creates an additional 1024 potential data paths corresponding to at least 2048 operations that can occur across multiple resources within IC die 203. Hence, the tightly coupled, highly localized, high bandwidth attributes of the resources in IC die section 203 enable at least 2048 operations to occur in a single clock cycle. Further, each of these 2048 operations that occur simultaneously in a single clock cycle can include a 32-bit word (e.g., a vector or operand) traversing a particular data path, depending on the type of operation being performed on the word.

In some implementations, and to expand on the above example, in a single clock cycle executed by system 200, one or more of the following can occur within a single VPU lane 102: 1) 8 vectors move from vmem 204 to the 8 sublanes 202; 2) two vector operands move from register 206 to ALUs 208a, 208b; 3) two result vectors move from ALUs 208a, 208b to register 206; 4) 8 vector operands move from respective sublanes 202 to either serializer 214 or 216 (described below); 5) 8 result vectors move from either mrf 114 or xrf 116 (described below); and 6) 8 result vectors move from the 8 sublanes to the XU/RPU serializer 218 (described below). The preceding list of example operations are merely representative of the high bandwidth attributes of the tightly coupled localized resources of system 200.

Special unit 210 provides additional local processing capability that, in some implementations, can be synonymous with functionality provided by the ALUs 208a/208b of the respective sublanes 202. In some implementations, special unit 210 can be described as a function processor unit. For example, special unit 210 can be designed to process and evaluate unary transcendental functions associated with arithmetic operations on vector data stored in local register 206. Hence, certain complex arithmetic operations corresponding to, for example, exponential functions or logarithmic functions can be executed by special unit 210.

As discussed above, a technical feature of the described systems 100, 200 is that each sublane 202 is substantially physically close together (i.e., very tightly coupled) such that high bandwidth arithmetic operations executed by ALU 208a and 208b both occur simultaneously during a single processor clock cycle. In some implementations, certain complex arithmetic operations may require additional/multiple clock cycles to complete. Thus, special unit 210 can be engaged by system 200 to segregate certain complex multi-cycle operations for special processing.

PRNG 118 can be a shared resource configured to generate pseudo random numbers that can be used by registers 206 across multiple sublanes 202 during vector arithmetic operations executed by ALUs 208a/208b of the respective sublanes 202. In general, PRNG 118 can receive at least one control signal from a processing unit 202 to initialize an example number generator circuit to an initial state. PRNG 118 can later evolve from that initial state to periodically generate a random number that can used by a particular processing unit 202 to accomplish a certain operation associated with vector arithmetic.

In general, each processing unit 202 will typically perform read operations relative to PRNG 118. Occasionally, a particular sublane may provide a control signal to PRNG 118 to execute a write sequence to, for example, cause a certain numerical reproducibility operation. Certain reproducibility operations can be used for implementation of specific numerical techniques that are applicable to computations involving neural networks inference workloads. Further, during vectorized computations, it can be beneficial for system 200 to generate certain narrower representations of one or more numbers by injecting random noise to slightly distort numerical rounding operations associated with the computations. Also, in some implementations, PRNG 118 can provide another source of operands for data processing that occurs within a sublane 202.

System 200 further includes a first data serializer 214, a second data serializer 216, an XU/RPU serializer 218, and data de-serializers 222a/b that are each coupled to a particular processor unit 202. In general, data serializers 214, 216 are configured to serialize vector output data that can include at least two operands provided by the particular processor unit 202 and received by MXU 110. As shown, the serialized vector data can be provided to MXU 110 via data paths 220a/b, such that a first operand can be provided via a first data path 220a and a second operand can be provided via a second data path 220b. In some implementation, data serializers 214 and 216 can be configured to function as a shift register that sequentially shift out operand data over multiple clock cycles (high latency).

In general, data serializer 214 and 216, can enable respective sublanes 202 to time multiplex serialized vector output data across expensive interconnect wires. The high-priced interconnect wires provide the data path 220a/b/c to distant non-local co-processing resources that execute certain multiply operations on received serialized vector data. As indicated above, for the implementation of FIG. 2, distant non-local co-processing resources can correspond to resources that are outside of IC die section 203 (e.g., MXU 110, XU 112, and RPU 113). These resources generally receive low bandwidth (e.g., single 32-bit operand), high latency (over multiple clock cycles) vector data via data path 220a/b/c.

Regarding data movement and data quantity, each of the 128 lanes (i.e., VPU lane 102) can have 8 data words or operands that are each 32-bits wide. The 8 data words can correspond to each of the 8 sublanes within VPU lane 102. System 200 can be configured to load the 8 data words into, for example, data serializer 214, 216, or 218. The 8 data words can then be shifted out to one of MXU 110, XU 112, or RPU 113 over a period of 8 processor clock cycles. In contrast to the shorter, wider, high-bandwidth data paths between the tightly coupled localized resources of IC die section 203, MXU 110, XU 112, and RPU 113 are each fairly distant and non-local relative to the units' proximity to resources of the respective sublanes 202.

Hence, in an example VPU that incorporates systems 100 and 200, every clock cycle the VPU can execute an instruction to perform operations that utilize and/or move 1024 words that are each 32-bits wide. When portions of vector data that collectively form the 1024 words arrive at and/or pass through a single data serializer 214, 216, the data then progresses through a data path 220a/b which only operates on, or shifts out, 128 words per clock cycle. Thus, the data serializer 214, 216 can be configured to only serialize data in the ×8 dimension such that there remains parallelism across each VPU lane 102 in the ×128 dimension.

For example, data serializer 214, 216 can be functionally independent of each other, thus, in a first clock cycle (e.g., cycle N) system 200 can cause all 1024 words (8 words per lane, 1 for each sublane, for all 128 lanes) to be loaded into, for example, a memory location of first data serializer 214 for a particular processing unit 202. System 200 can then execute one or more instructions to cause the contents of each first data serializer 214 across the 128 lanes to be shifted out toward MXU 110 via the corresponding data path 220a at a bandwidth of 16 bits per clock cycle. In some implementations, 32-bit words received by serializer 214 can be sent in a serialized manner as 16-bit rounded floating-point numbers.

Further, for clarity, although the 32-bit operands provided to MXU 110, XU 112, and RPU 113 are described herein as "words," the operands can generally correspond to numbers (e.g., floating points) and the descriptor "word" is used simply to indicate a fixed-sized piece of binary data that can be handled as a unit by hardware devices of an example processor core.

Referring again to the example data flow sequence, in a second clock cycle (e.g., cycle N+1) system 200 can cause another 1024 words (8 words per lane, 1 for each sublane, for all 128 lanes) to be loaded into, for example, a memory location of second data serializer 216 for the same processing unit 202. System 200 can then execute one or more instructions to cause the contents of each second data serializer 216 across the 128 lanes to be shifted out toward, for example, MXU 110 via the corresponding data path 220b at a bandwidth of 16 bits per clock cycle. Thus, data paths 220a/b that extend from data serializer 214, 216 can be used in parallel with each other.

In some implementations, this example data flow sequence can continue over multiple data cycles (e.g., cycle N+2, cycle N+3, etc.) to load MXU 110 with several sets of matrix multiply operands. When loaded, large amounts of matrix multiply operations associated with, for example, vectorized computations can be processed by MXU 110 to compute an example inference workload. Results of the matrix multiplications can be received by and stored within, for example, a memory unit of mrf 114 for receipt by a particular sublane 202 within particular VPU lane 102. Mrf 114 includes first-in first-out (FIFO) functionality and can be configured to hold/store return data (multiplication results) associated with longer latency operations. The return data stored within the memory of mrf 114 can be written back to a vector register 206 with a separate shorter latency instruction.

The matrix multiply results can be moved in a serialized data stream from MXU 110 to mrf 114 at a throughput of 32 bits per clock cycle. In some implementations, results of the matrix multiplications are received at a first time period and stored within mrf 114 after being de-serialized, by de-serializer 222a, for receipt by a sublane 202 at a second time period that is later in time than the first time period. In some implementations, the second time period corresponds to a point in time that can range from the occurrence of 1 clock cycle to the occurrence of 128 clock cycles.

For example, mrf 114 can receive, on a first processor clock cycle, matrix multiply results at a first time period and store the results within a memory address of mrf 114. After system 200 has executed an additional 100 processor clock cycles to perform other vector processing operations, system 200 can then execute an instruction to pop the mrf 114 and receive results data at the second time period that is 100 clock cycles later in time. As noted above, mrf 114 implements a first-in-first-out data flow sequence such that matrix multiply results that are received first are the first to be written to a particular vector register of registers 206.

Regarding reduction and permute operations, RPU 113 can include a sigma unit and a permute unit. In some implementations, results of computations processed by the sigma unit are provided to the permute unit. Either the sigma unit or the permute unit can be disabled such that data passes unchanged through a particular unit. In general, the sigma unit executes sequential reductions across a single data line. The reductions can include sums and various types of compares operations.

In response to receiving input data, the permute unit can execute full universal crossbar operations based, in part, on a command/control vector that is set using bits from the input data. For reduction operations, data used by RPU 113 can be a 32-bit floating point (FP) format; while for permute operations, a variety of data types/formats can be used including FP, integers, and addresses. In some implementations, RPU 113 provides any received data to XU 112, receives results data from XU 112, and executes one or more muxing operations to generate distinct output streams having multiple results data.

In some implementations, a permute operation can be executed, by RPU 113, to move data between at least two distinct VPU lanes 102. In general, the permute instruction causes 128×8 data values to be moved from respective registers 206 to sublane XU/RPU serializer 218. In particular, during execution of the permute operation, 32-bit vector result data is serialized in the ×8 dimension. So, within each of the 128 lanes (VPU lane 102), 8 vector result words corresponding to the 8 sublanes can be moved from a first VPU lane 102 to a second VPU lane 102 over a period of 8 processor clock cycles.

The vector data can be moved in a serialized data stream from XU/RPU serializer 218 to XU/RPU 112, 113 along data path 220c at a throughput of 32 bits per clock cycle spanning two lanes. For the particular VPU lane 102 that receives the cross-lane vector data, xrf 116 can include, for example, memory configured to store cross-lane vector result data received at a particular VPU lane 102. In some implementations, vector data can be received at a first time period and stored within xrf 116 after being de-serialized, by de-serializer 222b, for receipt by a sublane 202 at a second time period that is later in time than the first time period.

In some implementations, the second time period corresponds to a point in time that can range from the occurrence of 1 clock cycle to the occurrence of 128 clock cycles. For example, xrf 116 can receive, on a first processor clock cycle, vector data from a first VPU lane 102 at a first time period and store the results within a memory address of xrf 116. After system 200 has executed an additional 100 processor clock cycles to perform other vector processing operations, system 200 can then execute an instruction to pop the xrf 116 and receive vector data at the second time period that is 100 clock cycles later in time. In general, similar to mrf 114, xrf 116 also implements a first-in-first-out data flow sequence such that vector that is received first is the first to be written to a particular vector register of registers 206.

Figure 3:
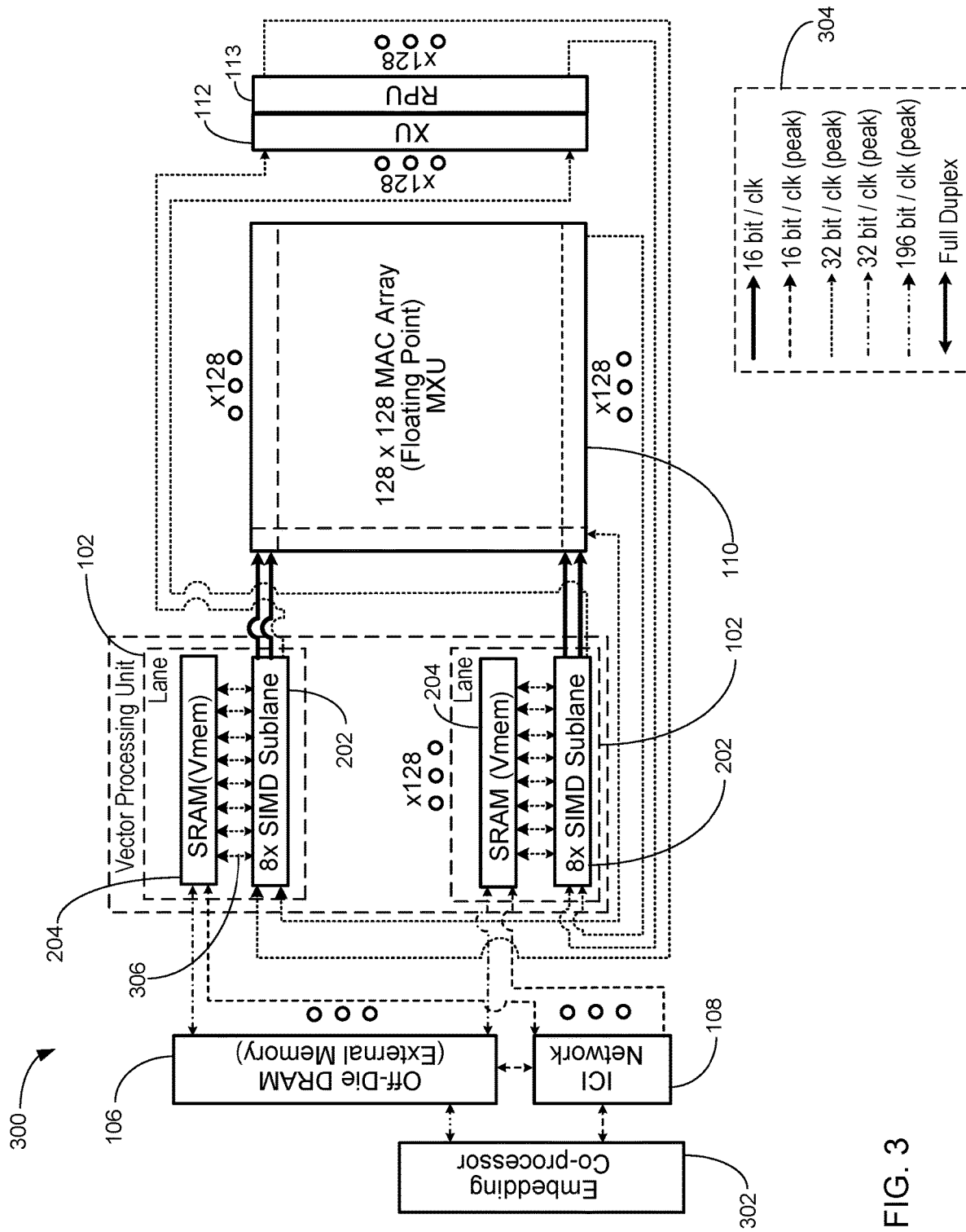
FIG. 3 illustrates a block diagram of an example computing system that includes a multiply accumulate array and multiple computing resources.

FIG. 3 illustrates a block diagram of the example computing system of FIG. 1 including a multiply accumulate array and multiple computing resources. As shown, system 300 can generally include one or more of the components discussed above with reference to FIGS. 1 and 2. System 300 can further include embedded co-processor 302. In general, processor 302 can be configured to execute software based programmed instructions to move blocks of data from external memory 106 to multiple vmems 204. Further, execution of the instructions can cause external memory 106 to initiate data transfers to load and store data elements within vmem 204.

FIG. 3 includes a data map 304 that indicates the relative size, e.g., in bits, associated with data throughput for a particular flow path. As shown, data map 304 includes various legends that correspond to individual throughput (in bits) for given path between certain computing resources. Note that data map 304 is not included in system 300 but rather is shown in FIG. 3 for clarity and to indicate the throughput for particular data paths that couple disparate computing resources.

In general, the example of FIG. 3 provides an alternative representation of the resources of system 200. For example, system 300 includes two VPU lanes 102 that correspond to two of the 128 individual lanes discussed above. Likewise, for each lane 102, system 300 further includes the two sublanes 202 that correspond to two of the 8 individual sublanes discussed above. System 300 further includes the 8 individual lanes 306 that provide the data flow path (via crossbar 212) between the 8 memory banks of vmem 204 and the respective 8 sublanes 202.

As discussed above, and as indicated by data map 304, eight 32-bit vector words can move from vmem 204 to the 8 individual sublanes during a single processor clock cycle. As shown, in some implementations, vmem 204 can be a static random access memory (SRAM) and sublane 202 can be described as a single input multiple data processing unit. System 300 further includes an alternative representation of the MXU 110 and the cross-lane (XU) unit 112 discussed above with reference to FIG. 2.

In general, MXU 110 corresponds to a multiply accumulate operator having a dimensionality of 128×128 and, thus, is configured to receive numerous sets of vector-matrix multiply operands. As noted above, once loaded with substantial quantities of vector operands, a large amounts of matrix multiply operations associated with vectorized computations can be processed by MXU 110 to compute an example inference workload.

As shown, each sublane 202 includes a data flow path toward (outbound) XU 112 as well as a data flow path from (inbound) XU 112 toward the sublane 202. These two distinct flow paths correspond to the XU's function of enabling vector data to move between at least two distinct VPU lanes 102. Thus, each VPU lane 102 will generally include an outbound vector data flow path toward XU 112 to correspond to when vector data from a first VPU lane 102 is moved to a second VPU lane 102. Likewise, each VPU lane 102 will generally include an inbound vector data flow path from XU 112 to correspond to when vector data from a first VPU lane 102 is received by a second VPU lane 102.

FIG. 4 is an example flow chart of a process for performing vector computations using the computing system of FIG. 1 and FIG. 2. Thus, process 400 can be implemented using the above-mentioned computing resources of systems 100 and 200.

Process 400 begins at block 402 and vector memory (vmem 204) provides data for performing one or more arithmetic operations. As noted above, vmem 204 can include multiple memory banks for storing respective sets of vector data. The vector data is provided to one or more processor units 202 of VPU lane 102. At block 404 at least one processor unit 202 receives the vector data provided by vmem 204. The received data can correspond to a particular memory bank and, further, can be vector data accessed, by processor unit 202, from a particular address location of the memory bank. The data received by processor unit 202 is used by register 206 to instantiate a particular vector register having multiple vector elements.

At block 406, data communications between the vmem 204 and at least one processor unit 202 are exchanged at a particular bandwidth (first bandwidth) based on processor unit 202 and vmem 204 being tightly coupled. In some implementations, for certain operations, data can be moved across one or more of the 8 lanes that interconnect vmem 204 and registers 206 of processor units 202 at an example bandwidth or data rate of 256 bits (8 lanes×32 bits) per clock cycle. In general, multiple operations can occur during a given clock cycle and the number of operations can be in the range of 1024-2048 operations per clock cycle (e.g., high bandwidth operations).

In some implementations, processor unit 202 and vmem 204 are tightly coupled when a particular distance (e.g., a first distance) between the two computing resources are in the range of 0.001-100 microns (micrometers). For example, processor unit 202 and vmem 202 can be tightly coupled when a first distance is between 0.001 microns and 0.1 microns, between 0.01 microns and 10 microns, or between 0.1 microns and 100 microns. Likewise, the multiple processing resources of processor unit 202 (e.g., register file 206, ALUs 208a/b, and special unit 210) can be tightly coupled relative to each other when a particular distance between the multiple resources is also in the range of 0.001-100 microns. The example distances provided above with reference to processor unit 202 and vmem 202 can also apply to distances between the multiple resources of processing unit 202.

At block 408, the received data can be used, accessed or modified by ALU 208a or ALU 208b of processor unit 202 to perform one or more arithmetic operations associated with vectorized computations for computing inference workloads. At block 410 of process 400, data communications between at least one processor unit 202 and MXU 110 are exchanged at a particular bandwidth (second bandwidth) based on processor unit 202 and MXU 110 being coupled, rather than tightly coupled.

In some implementations, for certain operations, data can be moved across at least one of the 2 data lines that interconnect a single processor unit 202 and MXU 110 at an example bandwidth or data rate of 32 bits (2 lines×16-bits) per clock cycle. In general, multiple operations, between local and non-local resources (e.g., sublane 202 to MXU or XU), can occur during a given clock cycle and the number of operations can be in the range of 10-12 operations per clock cycle (e.g., low bandwidth operations).

In some implementations, processor unit 202 and MXU 110 are coupled (as opposed to tightly coupled) when a particular distance (e.g., a second distance) between the two computing resources are in an example range of 200 microns-10 millimeters (mm). For example, processor unit 202 and MXU 110 can be coupled when a second distance is between 200 microns and 1 mm, between 500 microns and 2 mm, or between 1 mm and 10 mm. Likewise, processor unit 202 can be coupled, rather than tightly coupled, to XU 112 (or RPU 113) when a particular distance between the two computing resources is also in the range of 200 microns-10 mm.

The example distances provided above with reference to processor unit 202 and MXU 110 can also apply to distances between processing unit 202 and XU 112 (or RPU 113). In some implementations, the second distance can exceed 10 mm but can be less than a standard distance between separate ICs of a printed circuit board of an example computer system.

At block 412, MXU 110 receives at least two operands (each being 32 bits wide) from at least one processor unit 202. In general, the at least two operands are used by the MXU 110 to perform operations associated with vectorized computations for a multi-dimensional data array. As discussed above, MXU 110 can include an array of multiply accumulate operators (MAC array 310) configured to perform thousands of multiply and floating point operations associated with vectorized computations to compute an inference workload for a particular neural network layer.

MAC array 310 can be further configured to provide the computation results back to vmem 204 for storage in address locations of particular memory banks. In some implementations, a sublane 202 provides local vector results data to XU 112 such that results can be shared between one or more other VPU lanes 102. For example, computation results (output) from a first VPU lane 102 can be used as an input for computations occurring within another second VPU lane 102. In some implementations, the second VPU lane 102 can be configured to perform vectorized computations associated with inference workloads for another neural network layer.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An integrated circuit chip for performing neural network computations, the chip comprising:
   one or more matrix units, each matrix unit being configured to perform multiplications between weights of the neural network and activation inputs to generate accumulated values;
   a vector unit configured to perform vector computations on at least the accumulated values generated by the one or more matrix units, wherein the vector unit comprises a plurality of arithmetic logic units (ALUs) arranged across a plurality of lanes on the integrated circuit chip; and
   one or more hardware cross-lane units configured to move data between different lanes of the plurality of lanes, wherein the one or more cross-lane units are hardware components of the integrated circuit that enable data to move between at least two distinct lanes of the plurality of lanes.

2. The circuit of claim 1, wherein the vector unit comprises the plurality of lanes and each lane of the plurality of lanes comprises one or more of the plurality of ALUs.

3. The circuit of claim 1, wherein each of the one or more hardware cross-lane units is configured to enable data communication between the plurality of lanes.

4. The circuit of claim 3, wherein each of the one or more hardware cross-lane units interacts with at least one other unit of the integrated circuit chip to provide streams of vector data between two or more lanes of the plurality of lanes.

5. The circuit of claim 1, wherein the vector unit is configured to:
   add a first stream of vector data to a second stream of vector data; and
   store results of adding the first and second streams of vector data as a third stream corresponding to the results.

6. The circuit of claim 1, wherein each lane of the plurality of lanes comprises 16 ALUs.

7. The circuit of claim 6, wherein the vector unit is configured to:
   perform the vector computations based on concurrent use of two or more of the 16 ALUs.

8. The circuit of claim 6, wherein the vector unit is configured to:
   perform the vector computations based on concurrent use of all 16 ALUs across each lane of the plurality of lanes.

9. The circuit of claim 1, wherein each ALU of the plurality of ALUs are configured to perform a 32-bit arithmetic operation between streams of vector data that represent operands for the arithmetic operation.

10. The circuit of claim 9, wherein each of the plurality of ALUs interacts with at least one other unit of the integrated circuit chip to execute a function with respect to arithmetic operations involving the operands.

11. The circuit of claim 1, wherein:
    at least the one or more matrix units, the vector unit, and the one or more hardware cross-lane units represent a processor core of the integrated circuit chip; and
    the processor core is configured to process a single instruction stream at least across the plurality of lanes.

12. The circuit of claim 1, wherein:
    units of the integrated circuit chip are configured to operate on streams of data;
    a first stream of data progresses in a first direction toward at least one matrix unit; and
    a second, different stream of data progresses in a second direction away from the at least one matrix unit.

13. A method for performing neural network computations using an integrated circuit chip comprising one or more matrix units, one or more hardware cross-lane units, and a vector unit, wherein the method comprises:
    for each matrix unit:
      receiving weights of the neural network and activation inputs;
      performing multiplications between the weights and the activation inputs;
      generating accumulated values based on the multiplications;
    performing, using the vector unit, vector computations on at least the accumulated values generated by the one or more matrix units, wherein the vector unit comprises a plurality of arithmetic logic units (ALUs) arranged across a plurality of lanes on the integrated circuit chip; and
    moving, using the one or more hardware cross-lane units, data related to the multiplications or the vector computations between different lanes of the plurality of lanes wherein the one or more cross-lane units are hardware components of the integrated circuit that enable data to move between at least two distinct lanes of the plurality of lanes.

14. The method of claim 13, wherein the vector unit comprises the plurality of lanes and each lane of the plurality of lanes comprises one or more of the plurality of ALUs.

15. The method of claim 13, wherein each of the one or more hardware cross-lane units is configured to enable data communication between the plurality of lanes.

16. The method of claim 15, further comprising:
providing streams of vector data between two or more lanes of the plurality of lanes based on interactions between a hardware cross-lane unit and at least one other unit of the integrated circuit chip.

17. The method of claim 13, wherein performing the vector computations comprises:
adding a first stream of vector data to a second stream of vector data; and
storing results of adding the first and second streams of vector data as a third stream corresponding to the results.

18. The method of claim 13, wherein each lane of the plurality of lanes comprises 16 ALUs.

19. The method of claim 18, wherein performing the vector computations comprises:
performing the vector computations based on concurrent use of two or more of the 16 ALUs.

20. The method of claim 18, wherein performing the vector computations comprises:
performing the vector computations based on concurrent use of the 16 ALUs across each lane of the plurality of lanes in the vector unit.

21. The method of claim 13, wherein performing the neural network computations comprises:
performing, using one or more of the ALUs, a 32-bit arithmetic operation between streams of vector data that represent operands for the arithmetic operation.

22. The method of claim 21, wherein performing the neural network computations comprises:
executing a function with respect to arithmetic operations involving the operands based on interactions between one or more of the ALUs and at least one other unit of the integrated circuit chip.

23. The method of claim 13, wherein at least the one or more matrix units, the vector unit, and the one or more hardware cross-lane units represent a processor core of the integrated circuit chip, and the method comprises:
processing, at the processor core, a single instruction stream at least across the plurality of lanes.

24. A non-transitory machine-readable storage device for storing instructions to perform neural network computations using a circuit comprising one or more matrix units, one or more hardware cross-lane units, and a vector unit, wherein the instructions are executable by a processing device to cause performance of operations comprising:
for each matrix unit:
receiving weights of the neural network and activation inputs;
performing multiplications between the weights and the activation inputs;
generating accumulated values based on the multiplications;
performing, using the vector unit, vector computations on at least the accumulated values generated by the one or more matrix units, wherein the vector unit comprises a plurality of arithmetic logic units (ALUs) arranged across a plurality of lanes on the integrated circuit chip; and
moving, using the one or more hardware cross-lane units, data related to the multiplications or the vector computations between different lanes of the plurality of lanes, wherein the one or more cross-lane units are hardware components of the integrated circuit that enable data to move between at least two distinct lanes of the plurality of lanes.

* * * * *